J. A. JOHNSON.
SHOCK ABSORBER.
APPLICATION FILED JULY 2, 1917.
1,310,021. Patented July 15, 1919.
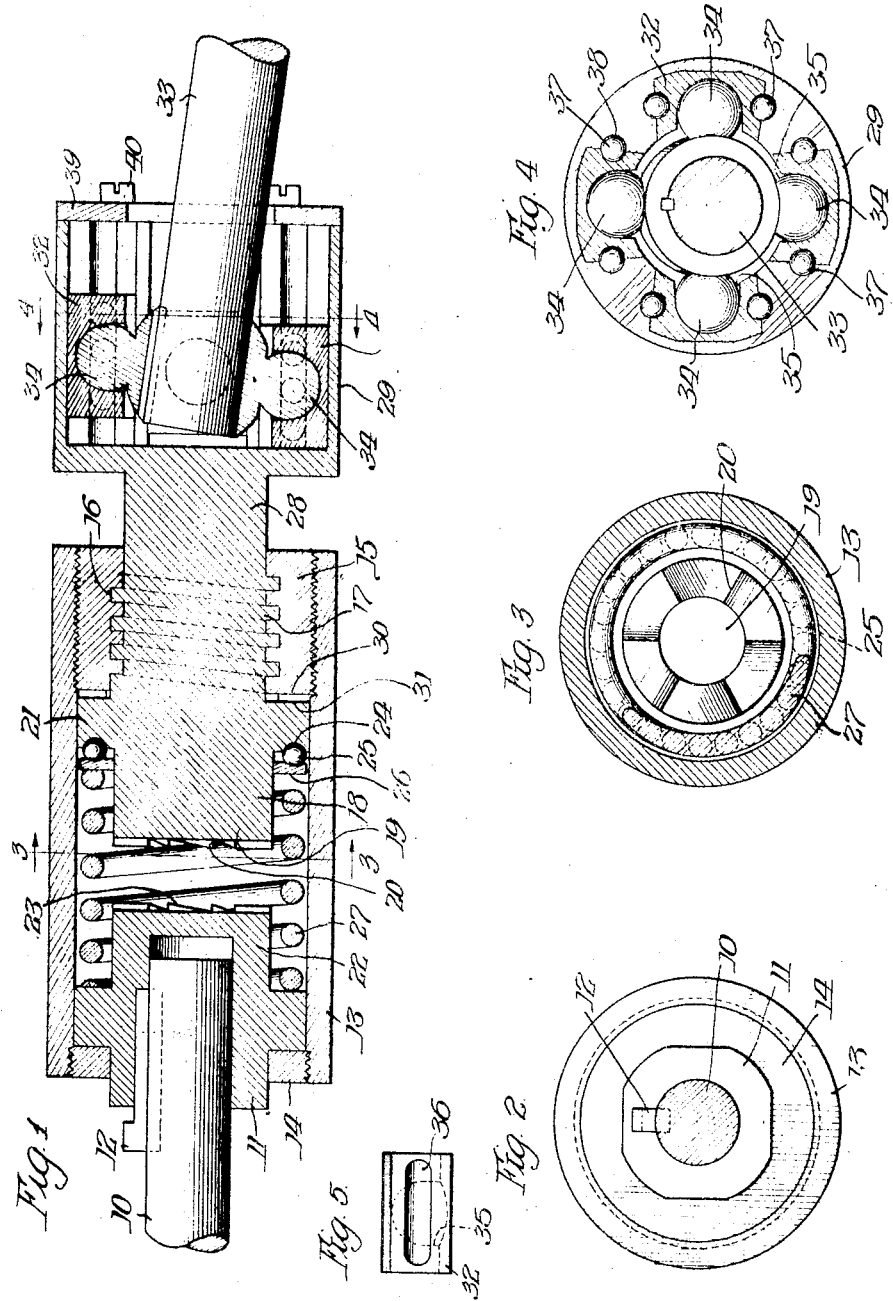
Witnesses:
Inventor
James A. Johnson
By Wilkinson & Huxley
Attys

UNITED STATES PATENT OFFICE.

JAMES A. JOHNSON, OF CHICAGO, ILLINOIS, ASSIGNOR OF ONE-HALF TO LEO J. REMM, OF CHICAGO, ILLINOIS.

SHOCK-ABSORBER.

1,310,021.  Specification of Letters Patent.  Patented July 15, 1919.

Application filed July 2, 1917. Serial No. 178,091.

*To all whom it may concern:*

Be it known that I, JAMES A. JOHNSON, a citizen of the United States, residing at Chicago, in the county of Cook and State of Illinois, have invented certain new and useful Improvements in Shock-Absorbers, of which the following is a specification.

My invention relates to a shock absorber for power transmission and particularly to shafting employed therein.

One of the objects of my invention is to provide a resilient connection in the line of shafting so that the application of power to the load on the shaft may be applied gradually.

Another object is to provide a novel shock absorbing means for shafting wherein the application of power to the load is applied gradually and carried by other than positive engagement with the driving shaft.

A still further object is to provide a novel shock absorber for shafts having a yielding connection which is adapted to be actuated gradually by actuation of the driving shaft and means for moving a portion of the yielding connection into positive engagement with the driving shaft.

These and other objects will be apparent from the drawings wherein:—

Figure 1 is a vertical sectional view embodying the preferred form of my invention.

Fig. 2 is an end view of the construction shown in Fig. 1.

Fig. 3 is a vertical section on line 3—3 of Fig. 1.

Fig. 4 is a vertical section on line 4—4 of Fig. 1, and

Fig. 5 is a side elevation of one of the sliding members in the universal joint.

It is desirable in certain types of shafting to have shock absorbing means interposed in the shaft so that the load may be started gradually, thus reducing the tremendous strain imposed on the shafting and also calling for a smaller amount of power to start the load, also to do away with the shocks attendant upon a sudden application of power to the train of mechanism. It is also desirable to apply yielding connections so that in case of breakage to either the load shaft or the driving shaft the machinery connected to the unbroken portion will not be harmed. It is essential in certain types of shaft installation namely, in automobile driving shafts to compensate for the play of the shaft as the automobile is driven over roads of uneven surface. The shaft in this instance vibrates to a considerable extent, hence the interposition of yielding means in the shaft line is very desirable. Furthermore, it is necessary in such installation to use at least one universal joint, more often two joints, as the engine shaft and transmission shaft are usually out of alinement.

My invention consists in the provision of a shock absorbing means comprising a driving shaft connected to a source of power, a casing connected to the end of the power shaft so as to turn therewith, a sliding hub mounted in the other end of the casing adapted to be turned by the casing and connected with the load shaft and universal joint, through friction members. If it is desired to use a shock absorbing element of the type of my invention without the universal joint, the sliding hub may be formed as an extension of the load shaft or may be provided with a squared aperture to receive the end of a squared shaft or the shaft may be splined therein, or a flange connection may be used if desired.

Referring to the drawings, 10 is a driving shaft connected to a suitable source of power such as a motor, steam engine or the like. The inner end of the shaft 10 is keyed to a boss 11 by the key 12 and the boss 11 is securely fastened within the casing 13 by means of a collar 14. The collar 14 and the boss 11 may be connected in any well known manner such as by bolts or by welding. The casing is closed at its other end by a bushing 15 threaded into the inner end of the casing and adapted to turn with the casing. In the embodiment shown the bushing 15 is provided with screw threads 16 to receive the threads 17 on a sliding hub 18. The hub 18 has a reduced end portion or boss 19 on the face of which are a series of teeth 20. For guiding the hub 18 longitudinally within the casing is an annular shoulder 21 which fits within the casing 13, and forms shoulders at the rearward portion thereof for abutting the inner face of the bushing 15, thus limiting the rearward movement of the hub. The boss 11 is also provided with a boss 22 having a series of like teeth 23 on its face adapted to engage the teeth 20 on the end of the boss 19. The forward portion of the collar 21 is provided with an annular groove 24 forming a ball race within which are ball bearings 25 held in place by cover plate 26 properly fastened to the shoulder 21. Mounted within the casing 13 and surrounding the bosses 22 and 19 and bearing against the cover plate 26 is a coiled spring 27 the purpose of which is to keep the bosses apart and to prevent the corrugated faces of the two bosses from immediate engagement. The hub 18 has also a rearwardly extending portion or shaft 28 to which connection with a propeller shaft may be made.

The operation of the shock absorbing member is as follows:

Power being applied to shaft 10 to turn it, the motion thereof is transmitted to the boss through the ring 14 to the casing 13 so that the casing turns with the shaft 10. Because of the positive engagement between the bushing 15 and the casing 13 the bushing turns also. The turning of the bushing acts on the threads 17, forcing the hub 18 inwardly toward the boss 11. Because of the spring 27 resistance to the inward movement of the hub is created, the result being that the two forces, one caused by the frictional engagement of the bushing 15 with the threads tending to move the hub and the other created by the resistance of the spring tending to oppose such movement acts to grip the hub 18 through the threads in such manner that motion to the hub will be imparted by the casing 13, by setting up a clamping engagement therewith. Gradually as the casing 13 is increasing in speed the hub 18 will be forced toward the boss 22 and eventually the corrugations of the faces of the bosses 19 and 22 will engage, thus forming a positive locking engagement between the driving shaft and the driven shaft 28. During this period the shaft 28 is being rotated much more slowly than the driving shaft 10 because of such floating connection but at an increasing speed. However, it may be desirable under certain circumstances to not have positive locking engagement between the bosses 19 and 22. In this case the spring 27 would be of such a nature as to cause the hub 18 to be rotated by the casing 13 without slipping before the corrugations on the end thereof engaged the corrugations on the end of the boss 22 in which instance the corrugations might be eliminated. It will be seen that this affords a frictional or clamping engagement between the driving means and the positive means and also a cushion engagement so that if at any time machinery connected with the shaft 28 be disconnected therefrom the engine shaft 10 will not be damaged because of the racing which will result when the load is suddenly removed from a revolving shaft. In like manner if anything should happen to the machinery on shaft 10 no ill effects would be delivered to the shaft 28 nor any of its connected machinery, for as soon as the rotation of the casing 13 varies, the frictional contact between the bushing 15, hub 18 and spring 29 will change and the hub 18 would move outwardly so as to gradually disconnect the frictional engagement between the casing 13 and the hub 18. For driving the shaft 28 in the reverse direction, I provide corrugations on the faces 30 of the bushing 15 and 31 of the hub 18 similar in nature to the corrugations 20 and 23 so that when the casing 13 is driven in the reverse direction the teeth or corrugations on the faces 30 and 31 will engage thus forming a positive reversing lock for transmitting reverse motion to the shaft 28.

It will be apparent that in my invention it is possible to deliver power gradually to the driven shaft in such manner that all possibility of damage thereto is eliminated. Motion is transmitted to the load or driven shafts through an arrangement of frictional spring engaging members, the frictional members tending to move the hub longitudinally and the spring members tending to oppose such longitudinal movement thereby setting up opposing forces which eventually permit the hub to move into positive engagement with the driving shaft or else, if the spring is of sufficient strength to prevent positive engagement of the bosses to carry the hub along in floating driving engagement the driving shaft not being positively connected with the driven shaft, thus when damage to either shaft occurs it is not transmitted to the other shaft and to the machinery connected thereto because of the interposition of the novel shock absorbing means above described.

I claim:

1. In a device of the class described, the combination of a driving shaft, a load shaft, a casing, a boss keyed to the driving shaft and secured to the casing, a threaded hub in the casing adapted for longitudinal and rotative movement therein, a boss on the hub, a bushing mounted in the casing adapted to turn therewith and having threads for coöperation with the threads on said hub, said bosses having notches in the inner ends thereof and a spring within the casing and surrounding the bosses tending normally to hold the latter in spaced relation, substantially as described.

2. In a device of the class described, the combination of a driving shaft, a load shaft, a casing, a hub mounted within the casing, a boss keyed to the driving shaft and to the casing, a bushing fastened in the casing surrounding the hub, coöperating means on the hub and bushing whereby the former is actuated rotatively and longitudinally by the latter and means tending to normally resist longitudinal movement of said hub by said bushing and means on said hub for positive engagement with said boss, substantially as described.

3. In a device of the class described, the combination of a driving shaft, a casing embracing the end of said shaft, a driven shaft having an extension slidably mounted within the casing, and frictional means within the casing for actuating said extension whereby the latter is turned and positive connections adapted to become effective after a predetermined frictional connection.

4. In a device of the class described, the combination of an engine shaft, a casing in positive engagement with the engine shaft, a load shaft having a sliding extension mounted in the casing, means within the casing for engaging the sliding extension and moving the same into driving connection with the engine shaft, and resilient means between the engine shaft and the sliding extension adapted to oppose movement of said sliding extension into engagement with the engine shaft, substantially as described.

5. In a device of the class described, the combination of a driving shaft, a casing in positive engagement therewith, a driven shaft having an extension longitudinally and rotatably mounted in the casing, said driving shaft and said extension having interfitting means for positive engagement under certain conditions, and means coöperating with said casing for imparting motion to said extension.

6. In a device of the class described, the combination of a driving shaft, a driven shaft, a casing embracing the adjacent ends of said shafts, frictional means within said casing for engaging said driven shaft, said means comprising a bushing secured to the casing, a threaded hub mounted therein and adapted for longitudinal movement, the driving shaft and hub having notches for positive engagement under certain conditions, and springs tending to oppose the advance of said hub when acted upon by said bushing into positive engagement with said driving shaft, substantially as described.

7. In a device of the class described, the combination of a driving shaft, a driven shaft having an end extension, a casing embracing the adjacent ends of the shafts, said extension being slidably mounted in said casing, connections between the driving shaft and said extension normally separated and adapted for positive operative connection under certain conditions, frictional connections between said extension and said casing whereby the driven shaft is rotated, and means tending to oppose motion of said extension into positive engagement with said driving shaft.

Signed at Chicago, State of Illinois, this 27th day of June, A. D., 1917.

JAMES A. JOHNSON.